United States Patent [19]

Van Wormer, Jr. et al.

[11] 4,382,808
[45] May 10, 1983

[54] ASSEMBLY FOR HOLDING A FILTER

[75] Inventors: William D. Van Wormer, Jr., Yorba Linda; Stephen A. Gniewek, Glendora; David L. Schlotterbeck, Brea, all of Calif.

[73] Assignee: Beckman Instruments, Inc., Fullerton, Calif.

[21] Appl. No.: 277,456

[22] Filed: Jun. 26, 1981

[51] Int. Cl.³ .............................................. B01D 46/10
[52] U.S. Cl. ......................................... 55/418; 55/480; 55/493; 55/501; 55/502; 55/503; 210/440; 210/450; 210/451; 210/455; 73/863.23
[58] Field of Search .................. 55/270, 344, 418, 480, 55/493, 501, 502, 503, 511; 73/863.23, 863.24, 863.25; 210/440, 445, 450, 451, 453, 455

[56] References Cited

U.S. PATENT DOCUMENTS

| 999,895 | 8/1911 | Smart | 55/493 |
|---|---|---|---|
| 1,439,151 | 12/1922 | Dailey et al. | 55/418 |
| 2,043,636 | 6/1936 | Thompson | 73/863.23 |
| 3,380,553 | 4/1968 | Gibel | 55/418 |
| 3,527,235 | 9/1970 | Fidelman | 55/418 |
| 3,561,253 | 2/1971 | Dorman | 55/502 |
| 3,720,046 | 3/1973 | Kudirka et al. | 55/344 |
| 3,841,145 | 10/1974 | Boubel | 55/270 |
| 3,957,469 | 5/1976 | Nebash | 55/501 |
| 3,966,439 | 6/1976 | Vennos | 55/501 |
| 4,259,099 | 3/1981 | Akabane et al. | 55/501 |

FOREIGN PATENT DOCUMENTS

| 42460 | 7/1933 | France | 210/451 |
|---|---|---|---|
| 52-23770 | 2/1977 | Japan | 210/445 |

Primary Examiner—David L. Lacey
Attorney, Agent, or Firm—R. J. Steinmeyer; P. R. Harder; Edward C. Jason

[57] ABSTRACT

An improved assembly for holding a filter element so as to define a filter assembly for removing particulate matter from a sample gas stream. First and second housing sections mount and enclose a replaceable filter element. An annular wall extending between the housing sections divides the interior of the housing into a first region open to an inlet, and a second region open to an outlet, the filter element being mounted in the second region, downstream of the wall. A plurality of openings through the wall assure that particulate matter collects evenly over the surface of the filter element. In this manner, the useful life of the filter element is greatly extended.

14 Claims, 11 Drawing Figures

ASSEMBLY FOR HOLDING A FILTER

BACKGROUND OF THE INVENTION

Under circumstances where suspended particulate matter must be removed from a gas stream, it has long been the practice to use a filter assembly containing a replaceable paper or other suitable filter element. In instruments which measure the composition of automobile exhaust gases, for example, it is customary to filter suspended soot particles from the exhaust gases before the latter are applied to the sensitive interior of the instrument. One filter assembly of this type, which may be termed an axial-flow filter, includes a filter element mounted within an elongated or tubular housing. In filter assemblies of this type, the sample gas is introduced at one end through an inlet that lies generally parallel to the axis of the housing, passes through the filter element, and exits at the opposite end through an outlet that also lies generally parallel to the axis of the housing.

Another type of filter assembly, commonly known as a pancake filter, includes a filter element that is mounted in a flattened or disc shaped housing. In filters of this type, the inlet and outlet of the filter are frequently not aligned with the axis of the housing. On the contrary, the inlet and outlet may penetrate the same end of the housing or may even penetrate the housing from the side. Filter assemblies of this type are often used in applications in which the space available for the filter assembly, or the directions from which the inlets and outlets can enter the housing, are limited by the design of the surrounding devices.

One problem with existing pancake filters is that they establish internal gas flow patterns such that suspended particulates become concentrated on the portion of the filter element that is closest to the outlet of the filter. This uneven accumulation of particulates tends to reduce the useful life of the filter element below that which would be the case if particulates accumulated evenly over the surface thereof. This causes it to be necessary to replace filter elements relatively frequently, resulting in inefficient and uneconomical filter element usage. More importantly, however, the relatively frequent changing of filter elements requires relatively frequent interruptions in the taking of measurements on the instruments with which the filter assembly is used. Alternatively, the failure to change filter elements relatively frequently can cause drift in an instruments' output readings over a period of time.

In view of the foregoing, it will be seen that, prior to the present invention, it was often necessary for an instrument designer to choose between using a bulky filter assembly with desirable particulate deposition characteristics, and using a compact filter assembly with undesirable particulate deposition characteristics.

SUMMARY OF THE INVENTION

In accordance with the present invention there is provided an improved filter assembly which has the most desirable features of both pancake-type and axial-flow type filters. More particularly, the filter of the present invention may be used both in places where only a limited amount of space is available, and in places where even particulate deposition is required. Thus, the filter assembly of the invention eliminates the need for using more than one type of filter structure.

The present invention contemplates a filter assembly having a dividing wall that effectively partitions the interior of its housing into a first chamber that is open to the inlet and a second chamber that is open to the outlet. The flow of gas between these chambers is directed toward the filter element by a plurality of openings through the dividing wall. In accordance with an important feature of the present invention, these openings are distributed along the periphery of the dividing wall so that the sample gas approaches the filter element approximately equally from all directions. As a result, the accumulated particulate matter distributes itself evenly over the entire surface of the filter element, thereby providing the above-described advantages.

In the most preferred embodiment of the present invention, the sizes of openings in the dividing wall are related to the locations of the openings so that the incoming gas stream is effectively divided into a plurality of component gas streams having approximately equal flow rates. More particularly, the openings in the wall that are closest to the sample gas inlet are made relatively small while the openings that are most distant from the sample gas inlet are made relatively large. This size distribution tends to reduce the rate at which gas flows through the openings that are nearest the inlet and to increase the rate at which gas flows through the openings that are furthest from the inlet. As a result, the rate at which gas flows through the openings are rendered substantially equal and independent of the position of the openings along the periphery of the wall. Thus, the filter element is exposed to a gas flow pattern that is substantially isotropic.

As a result of the above-described characteristics, the filter assembly of the invention provides considerable freedom of choice as to the directions from which the inlet of the filter assembly penetrates the housing thereof. The sample inlet may, for example, penetrate either end of the housing, from a variety of directions, including those that are parallel or perpendicular to the axis of the housing. In general, the inlet may penetrate the housing at any point, and from any direction, that allows the sample gas to enter the filter assembly on the inlet side of the dividing wall. Thus, the filter assembly of the present invention can accommodate a wide variety of system dictated inlet and outlet positions and orientations.

DESCRIPTION OF THE PREFERRED EMBODIMENTS

Figure 1:
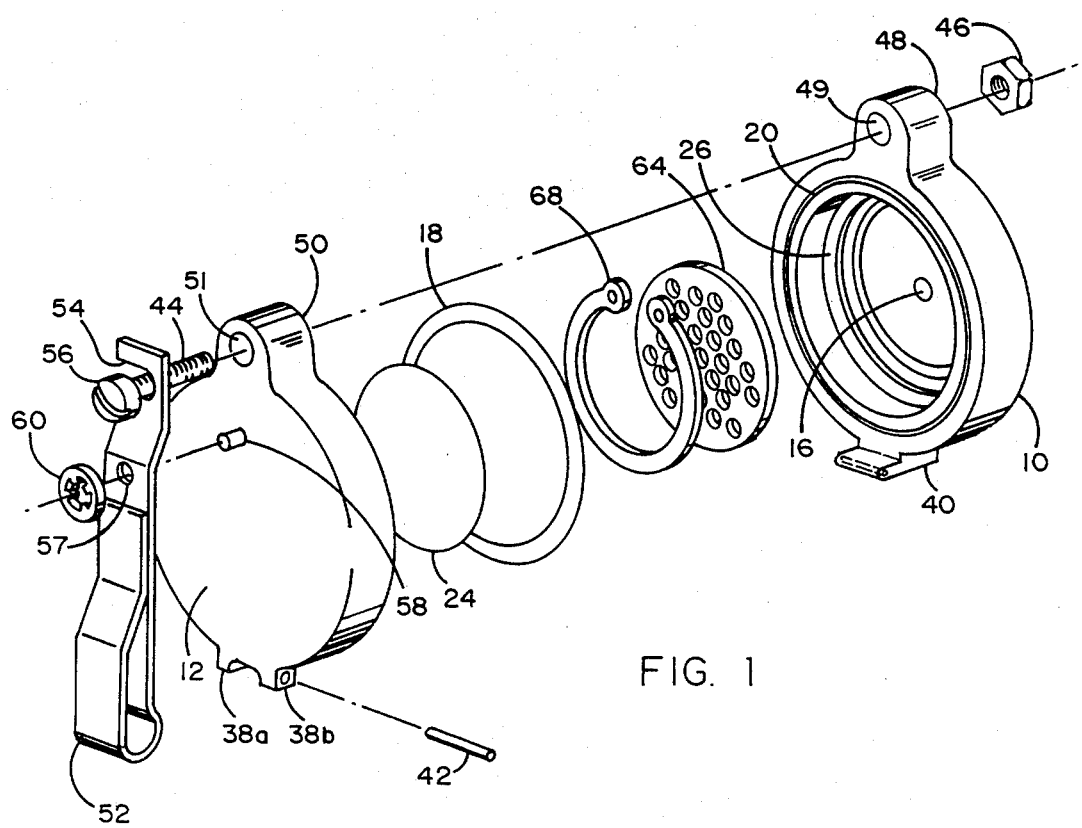
FIG. 1 is an exploded view of the preferred embodiment of the present invention.
Figure 4A:
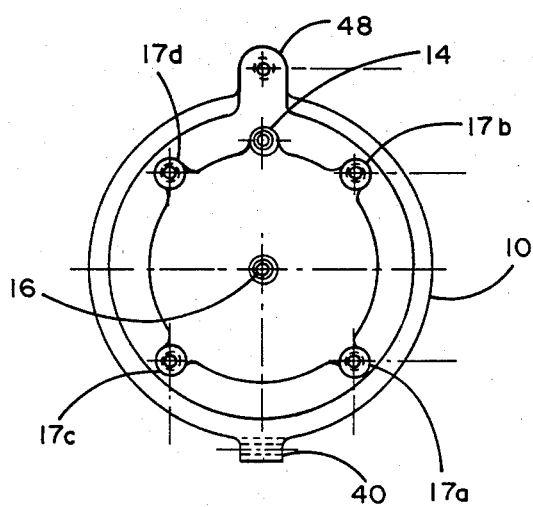
Figure 4B:
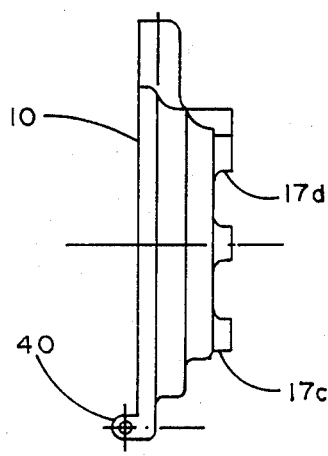
Figure 4C:
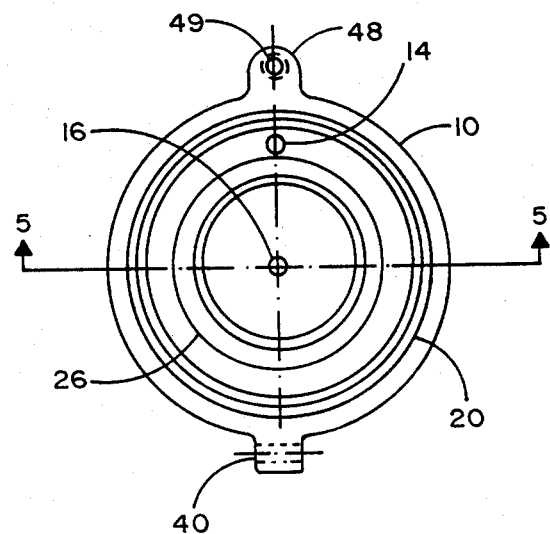
Figure 6:
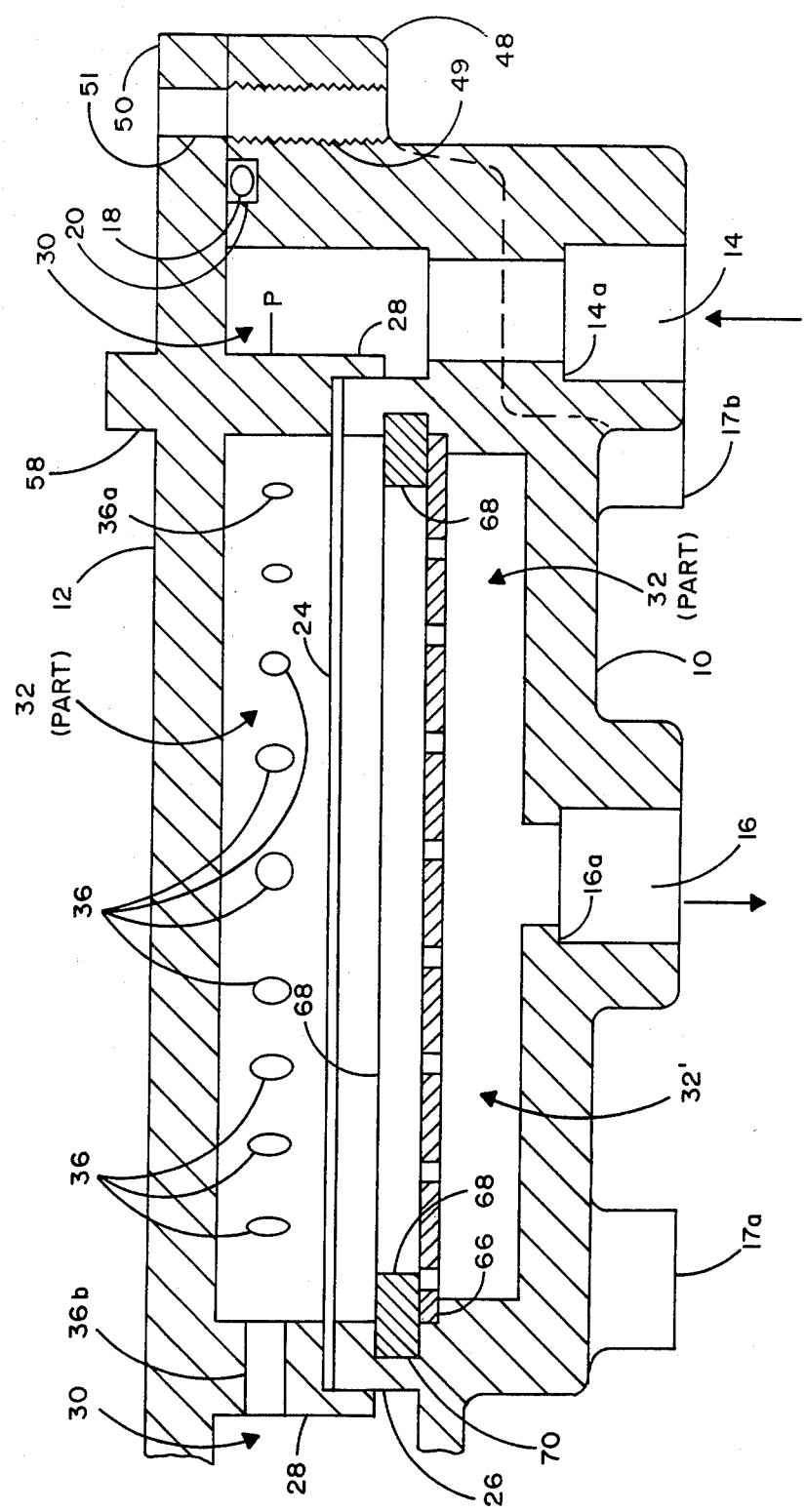
FIG. 6 is a partial cross-sectional assembly view of the preferred embodiment.

Referring to FIG. 1, there is shown an exploded view of the preferred embodiment of the filter assembly of the invention. The filter assembly of FIG. 1 includes a housing having first and second sections 10 and 12, respectively, which sections are adapted to be fit together or joined as shown in FIG. 6. When joined as shown in FIG. 6, housing sections 10 and 12 form an enclosure which is penetrated only by a sample gas inlet 14 (best seen in FIGS. 4a, 4c and 6) and a sample gas outlet 16 (best seen in FIGS. 1, 4a, 4c and 6). A suitable O-ring 18, positioned within a mounting groove 20 in section 10, seals off the interior of the filter housing from the atmosphere.

To the end that suspended particulate matter may be removed from the gas stream entering inlet 14 and exiting outlet 16, there is provided a filter element 24. Typically, filter element 24 comprises a porous paper disc having a pore size and thickness suitable for filtering automobile exhaust gases. In general, however, filter element 24 may have any composition and configuration that is suitable for use with the type of sample gas to be filtered.

In the preferred embodiment of the invention, filter element 24 is mounted between inlet 14 and outlet 16 by holding element 24 in place between a first annular wall section 26 which is integral with and projects from housing section 10, and a second annular wall section 28 which is integral with and projects from housing section 12. Annular wall section 28 is most clearly visible in FIGS. 2 and 3; annular wall section 26 is most clearly visible in FIGS. 4c and 5. The two-section wall formed by wall sections 26 and 28 (hereinafter collectively referred to as wall 26-28 for the sake of brevity) is visible in cross-section in FIG. 6. Therein it will be seen that wall section 28 has a groove or shoulder which receives and abuts section 26. When element 24 is mounted between wall sections 26 and 28, the periphery thereof serves as an inner gas-tight seal between housing sections 10 and 12, this inner seal being in addition to the outer seal that is provided therebetween by O-ring 18. As a result of this inner and outer seal, the only gas flow path between inlet 14 and outlet 16 is through filter element 24.

In addition to the above-described mounting and sealing action, wall sections 26 and 28 serve collectively as a dividing wall 26-28 that partitions the interior of the filter assembly into an outer chamber or region 30 that is open to inlet 14 and an inner chamber or region 32 that is open to outlet 16 (See FIG. 6). The purpose of this partitioning is to restrict the directions from which incoming sample gas may flow toward filter element 24 to those directions that are associated with openings 36 through wall 26-28. In accordance with the present invention, the number, size and distribution of openings 36 are such that incoming sample gas flows toward element 24 substantially uniformly from all directions.

More particularly, wall section 28 includes a plurality of openings, collectively designed 36, which connect chambers 30 and 32 at points that are upstream of filter element 24. These openings effectively divide the incoming sample gas stream into a plurality of component gas streams that flow toward filter element 24 from a number of different directions around the periphery of wall 26-28. As a result, the filter assembly of the invention does not tend to concentrate particulate matter on the part of the filter element that lies along the shortest path joining the inlet and outlet of the filter, as did prior pancake type filters. Instead, wall 26-28 and the openings therein cooperate to spread particulate matter relatively evenly over filter element 24. This, in turn, allows the filter elements to be changed less frequently, resulting in a savings both in the cost of filter elements and in terms of a reduced number of interruptions in the operation of the devices with which the filter assembly is used.

Because inlet 14 introduces sample gas at only one point in outer chamber there is a tendency for those of openings 36 which are relatively close to inlet 14 to supply more sample gas to inner chamber 32 than those openings which are relatively distant from inlet 14. As a result, if all of openings 36 are the same size, more particulate matter tends to collect on the half of filter element 24 that is adjacent to inlet 14 than on the half that is opposite inlet 14. This partly uneven distribution of particulates represents a significant improvement over prior filter assemblies, although it does not provide the full benefit of the preferred embodiment of the invention. In the event that this partly uneven distribution is unsatisfactory, the sizes of openings 36 may be made to increase with their distance from outlet 14, as will now be explained.

Figure 2:
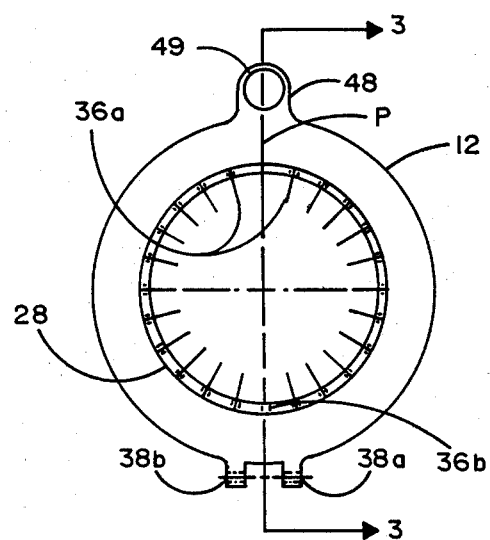
FIG. 2 is a plan view of one half of the filter housing shown in FIG. 1.

In the preferred embodiment, the openings or holes such as 36a which are closest to inlet 14, as shown in FIG. 2, are made smaller than all of the other openings, and the opening 36b which is furthest from inlet 14 is made larger than all of the other openings. Ideally, the sizes of the openings between openings 36a and 36b will increase continuously, in a graded sequence, from opening 36a to opening 36b so that the path between inlet 14 and outlet 16 through each opening has substantially the same flow resistance as that through each other opening. In this manner each component gas stream into which the incoming sample stream is divided will have the same flow rate and the same particulate content, causing uniform particulate deposits on the surface of filter element 24. Obviously, to the extent that a precisely even distribution of particulate matter is not critical, the sizes of various ones of openings 36 may deviate somewhat from their ideal graded-sequence values so that the number of different drill sizes needed to make openings 36 may be kept to a minimum.

Figure 3:
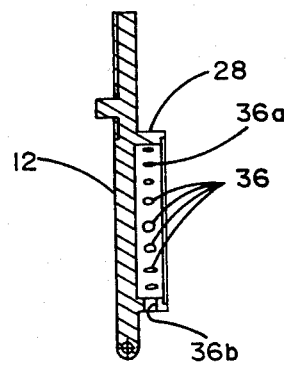
FIG. 3 is a cross-sectional view taken along the line 3—3 of FIG. 2, FIGS. 4a–4c are, respectively, the front, side and rear views of the other half of the filter housing shown in FIG. 1.

Referring to FIGS. 2 and 3, there is shown the opening pattern adopted for use in the commercial embodiment of the present invention. Therein it will be seen that no hole is provided at the point P on wall 26-28 that is closest to inlet 14. Along the remainder of wall 26-28 holes of varying sizes are distributed, symmetrically with respect to point P, at 15° intervals, around the entire periphery of the wall. Among these holes, the four that are closest to point P have a diameter of 0.062 inches, the next nearest six holes have a diameter of 0.093 inches, and the remaining 13 holes have a diameter of 0.125 inches. This grouping of holes into a plurality of sets of holes, with each hole in a set having the same diameter, provides an economical compromise between the desired uniformity of particulate deposition on filter element 24 and the desired small number of different drill sizes used in making the openings. It will be understood, however, that all reasonable combinations of hole distributions and hole sizes are within the contemplation of the present invention.

In the embodiment of FIGS. 1-6, inlet 14 and outlet 16 are both located on the same side of filter element 24, i.e., in housing section 10. It will be understood, however, that inlet 14 may in general penetrate the filter housing at any point and from any direction that will give it access to outer chamber 30. Inlet 14 may, for example, penetrate housing section 12 and enter chamber 30 from the top, instead of penetrating housing section 10 and entering chamber 30 from the bottom, as shown in FIG. 6. Inlet 14 may also penetrate the filter assembly housing from the side (i.e., from a direction perpendicular to the central axis of the assembly) should this prove to be desirable to accommodate the inlet and outlet fittings to which inlet 14 and outlet 16 are connected. The use of these alternative points and directions of entry are possible because the present invention masks the actual orientation of the inlet by evenly distributing sample gas flow around the periphery of chamber 30 without regard thereto. It will be understood that, in embodiments of the invention which unequal opening sizes are used, the point at which inlet 14 enters chamber 30 should be selected to be close to the smallest of the inlet openings such as 36a.

In spite of the generality of the foregoing, the preferred embodiment of the invention contemplates locating inlet 14 on the same section of the filter housing as outlet 16. This is because so positioning the inlet and outlet allows the filter assembly to be opened for the removal and replacement of a filter element, without disconnecting either inlet 14 or outlet 16 from the devices with which it is used. The gas lines leading to and from the filter assembly may, for example, be pushed into inlet 14 and outlet 16 until they encounter shoulders 14a and 16a and then be soldered in place to provide a permanent leak-proof connection. Threaded or other types of inlet and outlet line couplings may also be used. Mounting bosses 17a-17d having threaded mounting holes (See FIG. 4a) may also be provided to mount the filter assembly on a suitable mounting plate or bracket.

To the end that the filter assembly of the invention may be conveniently opened and closed during the process of removing and replacing a filter element, corresponding ends of housing sections 10 and 12 may be joined by a hinge of any suitable type. As is best seen in FIGS. 1, 2, 4a and 4b, this hinge may include outer hinge projections 38a and 38b, on housing section 12 and an inner hinge projection 40 on housing section 10, these hinge projections being joined by a suitable pin 42 shown in FIG. 1. The hinge arrangement of the embodiment of FIG. 1 is the preferred structure for joining housing sections 10 and 12. One reason is that the hinge allows housing section 12 to be simply swung away from housing section 10 while filter element 24 is being removed and replaced. Another reason that a hinge is preferred is that it maintains the desired alignment between sections 10 and 12 during the opening and closing of the filter assembly. Other structures for joining housing sections 10 and 12 may also be used and these structures will be described hereinafter.

In embodiments having the above-described hinge arrangement, the non-hinged ends of housing sections 10 and 12 are preferably fastened and unfastened by means of a bolt 44 and nut 46 which join lugs 48 and 50 on housing sections 10 and 12, respectively. While bolt 44 and nut 46 may be used in the conventional manner to simply bolt together housing sections 10 and 12, the preferred embodiment of the invention contemplates a quick disconnect fastening arrangement which allows the desired fastening and unfastening operation to be accomplished quickly and conveniently without the use of tools.

In the quick disconnect arrangement used in the embodiment of FIG. 1, the head of bolt 44 is chosen to have a diameter which is smaller than the diameter of a non-threaded hole 51 in lug 50. This allows housing section 12 to be swung away from housing section 10, while bolt 44 remains fastened to housing section 10 by nut 46 and the threads of a threaded hole 49. The desired fastening and unfastening action is then provided by means of a locking member 52 having a U-shaped opening 54 that is arranged to engage a groove 56, which is cut into bolt 44 just under the head thereof when member 52 is rotated with respect to a hole 57 therein. The desired alignment of opening 54 and groove 56 is assured by pivotally mounting member 52 so that hole 57 fits over a projection 58. When so mounted member 52 may be held in place with a suitable retaining washer 60.

During use, when it is desired to open the filter assembly, locking member 52 is simply rotated until U-shaped opening 54 disengages from groove 56 and thereby frees housing section 12 for rotation away from housing section 10. After removal and replacement of filter element 24, the filter assembly may be re-closed by rotating housing section 12 back into position against housing section 10 and rotating locking member 52 until opening 54 once again engages groove 56. Because this entire sequence of actions can be accomplished through manipulation of member 52, it will be seen that the entire opening, replacement and closing sequence can be accomplished in just a few seconds, with one hand.

While the above-described hinge and locking arrangements make the use of the filter assembly of the invention more convenient, they are not essential to the practice thereof. Housing section 12 of FIG. 1 may, for example, be replaced by any suitable end cover or plate having a dividing wall of the type that is compatible with that of housing section 10. Such an end cover may, for example, be connected to or disconnected from housing section 10 by suitable mating threads on housing sections 10 and 12. Other fastening arrangements, such as the twist-lock type fastening arrangement that is frequently used on containers for household products, are also feasible. In general, any fastening arrangement whereby housing sections 12 and 10 may be conveniently fastened and unfastened is suitable for use in practicing the present invention.

Figure 5:
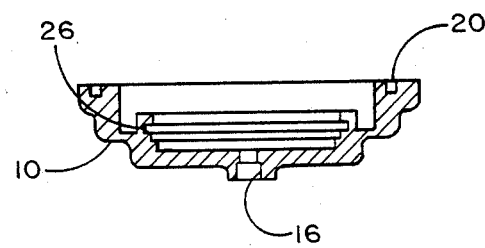
FIG. 5 is a cross-sectional view taken along the line 5—5 of FIG. 4c.

To the end that filter element 24 may be protected from damage resulting from the stresses that are incident to the flow of gas therethrough, the filter assembly of the invention may include a perforated metal backing disc 64 that is mounted in an annular recess 66 in housing section 10 (See FIGS. 5 and 6). Preferably disc 64 has a large enough number of holes, of sufficient size, that it provides no appreciable resistance to the flow of sample gas therethrough. Additionally, disc 64 is preferably sufficiently rigid that it can provide support to filter element 24 when the latter becomes pressed thereagainst by the dynamic pressure of sample gas flow. Because of the spatial separation of element 24 and perforated disc 64, the latter also serves to some extent as a diffuser which, together with openings 36, helps to distribute particulate matter evenly over the surface of filter element 24. Thus, perforated disc 64 serves a dual function.

As previously explained, the filter assembly of the invention is preferably mounted in the orientation shown in FIG. 1. In this orientation, perforated disc 64 may become dislodged when the housing assembly is opened. In order to prevent this from occurring, disc 64 is preferably held in place by means of a snap-ring 68 which fits into an annular recess 70 in dividing wall 26 of housing section 10 (see FIG. 6). Alternatively, disc 64 may be attached by spot welding or other suitable fastening means that will hold disc 64 firmly in place for all possible orientations of the filter assembly.

While the embodiment of FIGS. 1-6 is provided with an interior dividing wall 26-28 having a first section 26 that projects from housing section 10 and a second section 28 that projects from second housing section 12, this division of wall 26-28 between housing sections 10 and 12 is not an essential feature of the present invention. Dividing wall 26-28 may, for example, project entirely from housing section 10, without a mating projection from housing section 12, or may project entirely from housing section 12, without a mating projection from housing section 10. An embodiment of the latter type is shown in the partial cross-sectional view of FIG. 7.

Figure 7:
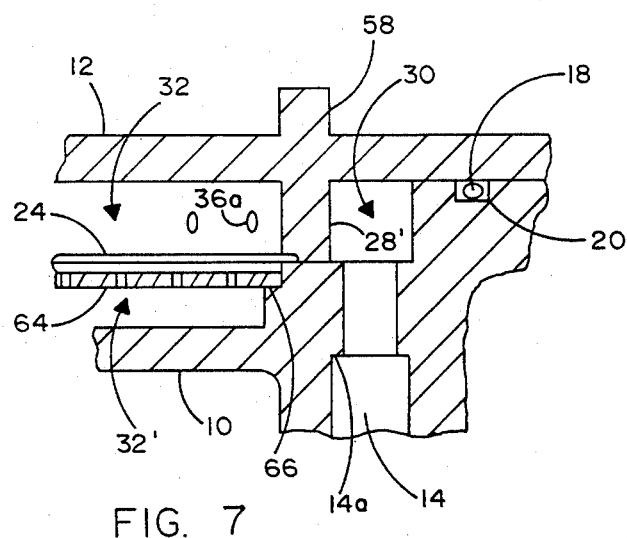
FIGS. 7 through 9 are partial cross-sectional views of alternative embodiments of the invention.

Referring to FIG. 7, there is shown a partial cross-sectional view of that portion of the filter assembly which is in the immediate vicinity of inlet 14, corresponding parts in FIGS. 6 and 7 being similarly numbered. The embodiment of FIG. 7 is generally similar to that of FIGS. 1-6. Like the embodiment of FIGS. 1-6, the embodiment of FIG. 7 includes a dividing wall 28' that partitions the interior of the filter assembly into an outer chamber 30 that is open to inlet 14 and an inner chamber 32 that is open to outlet 16, through filter element 24. Additionally, the embodiment of FIG. 7 is like that of FIGS. 1-6 in that both embodiments include a dividing wall having a plurality of circumferential openings 36 for distributing the flow of sample gas approximately evenly over the surface of filter element 24.

The embodiment of FIG. 7 differs from that of FIGS. 1-6, however, in that, in the embodiment of FIG. 7, dividing wall 28' extends entirely from housing section 12 with no mating projection from housing section 10. In addition, perforated disc 64 of FIG. 7 is preferably permanently attached to housing section 10 as, for example, by threads or welds in order to eliminate the need for a separate retaining ring. In all operational respects, however, the embodiment of FIG. 7 produces the same results as were described previously in connection with the embodiment of FIGS. 1-6 and accomplishes those results in substantially the same way.

Figure 8:
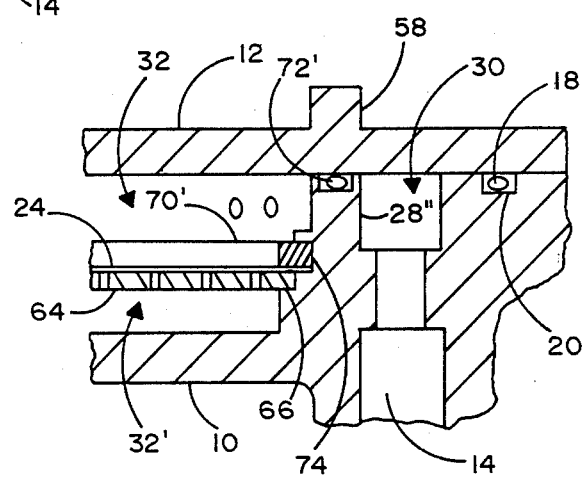

Still another embodiment of the invention is illustrated in fragmentary cross-sectional form in FIG. 8. The embodiment of FIG. 8 is generally similar to those of FIGS. 1-6 and FIG. 7, corresponding parts in all Figures being similarly numbered. One difference between the embodiment of FIG. 8 and the previously described embodiments is that in the embodiment of FIG. 8 the dividing wall 28" extends entirely from housing section 10, with no corresponding projection from housing section 12. Another difference is that, in FIG. 8, the inner seal between housing sections 10 and 12 is provided by an O-ring 72' that is located at the junction between the dividing wall and housing section 12, rather than by the periphery of element 24 that is located between the dividing wall and housing section 10, as shown in FIG. 7. Finally, the embodiment of FIG. 8 differs from the other embodiments of the invention in that filter element 24 is supported directly against perforated disc 64. In the latter position, handling considerations may make it desirable to mount filter element 24 with a retaining ring 70' seated in a locking recess 74.

Figure 9:
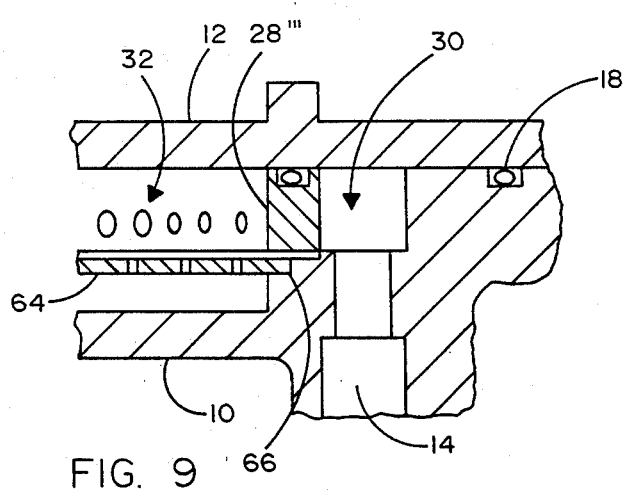

Still another embodiment of the invention is shown in fragmentary cross-sectional form in FIG. 9. The embodiment of FIG. 9 differs from all previously described embodiments in that dividing wall 28''' of FIG. 9 is a separate element, i.e., does not form a part of or project from either of end sections 10 and 12. In all important respects, however, the embodiment of FIG. 9 operates in the same manner as the embodiments of FIGS. 1 through 8. Because the filter assembly of FIG. 9 may be awkward to assemble and disassemble in certain orientations, it is contemplated that this embodiment be used primarily in applications in which the plane of filter element 24 is generally horizontal. It will be understood that, in applications in which it is desirable that filter element 24 not rest directly against perforated disc 64, annular recess 66 may be made sufficiently deep to provide the desired separation therebetween, as shown in FIGS. 6 and 7.

While the present invention has been described in connection with a number of specific embodiments, it will be understood that the true scope thereof should be determined only with reference to the following claims.

What is claimed is:

1. In an assembly for holding a filter element which is adapted to remove particulate matter from a gas that flows therethrough, said assembly having a housing including first and second generally disc-shaped housing sections, and an inlet and outlet for connection to a source of a gas to be filtered, the improvement comprising:
   (a) means for fastening said housing sections together to form a closed housing,
   (b) an annular wall extending between and generally perpendicular to the first and second housing sections, said wall dividing the interior of the housing into a first, generally annular outer chamber open to the inlet and a second, generally cylindrical inner chamber open to the outlet,
   (c) means defining a plurality of openings through said wall and spaced about the periphery thereof whereby gas flowing from said inlet to said outlet enters said inner chamber from a plurality of different directions, and
   (d) means for mounting a filter element within the housing at a location between said outlet and said openings.

2. An assembly as set forth in claim 1 in which the sizes of said openings are unequal, the size of each opening being related to the length of the gas flow path between that opening and the inlet.

3. An assembly as set forth in claim 1 in which the openings are grouped into a plurality of sets of openings, each opening in a set having the same size as each other opening in the same set.

4. An assembly as set forth in claim 1 in which the wall includes a first annular projection from the first housing section and a second, mating annular projection from the second housing section.

5. An assembly as set forth in claim 1 in which the wall is defined by an annular projection from the first housing section.

6. An assembly as set forth in claim 1 in which the wall is defined by an annular projection from the second housing section.

7. An assembly as set forth in claim 1 in which the wall is an annular element separate from said first and second housing sections.

8. An assembly as set forth in claim 1 including a perforated disc positioned between said mounting means and the outlet.

9. An assembly as set forth in claim 1 in which the sizes of the openings increase with the lengths of the gas flow paths between those openings and the inlet.

10. In an assembly for holding a filter element which is adapted to remove particulate matter from a gas that flows therethrough, said assembly having a housing including first and second generally disc-shaped housing sections, and an inlet and outlet for connection to a source of gas to be filtered, the improvement comprising:
(a) means for holding said housing sections together to form a closed housing,
(b) a generally annular dividing wall bridging the space between the first and second housing sections for partitioning the interior of the housing into an outer generally annular region that is open to the inlet, and an inner, generally cylindrical region that is open to the outlet,
(c) a plurality of holes through the wall for conducting a flow of gas from said outer region to said inner region, said holes being constructed and arranged to divide a stream of gas entering the inlet into a plurality of component gas streams having approximately equal flow rates, each of which flows radially inwardly toward the outlet from a different direction, and
(d) means for supporting a filter element in a position between the outlet and said holes.

11. An assembly as set forth in claim 10 including a perforated disc positioned between the outlet and the supporting means.

12. An assembly as set forth in claim 10 in which the sizes of the holes increase with the lengths of the gas flow paths between those holes and the inlet.

13. An assembly as set forth in claim 10 in which the holes that are nearest the inlet have the smallest diameters, in which the holes that are furthest from the inlet have the largest diameters, and in which the holes that are located between the largest and smallest holes have intermediate diameters.

14. An assembly as set forth in claim 10 including a seal between said housing sections for sealing said outer region from the environment.

* * * * *